(12) United States Patent
Lee et al.

(10) Patent No.: US 8,309,670 B2
(45) Date of Patent: Nov. 13, 2012

(54) OPTICAL FILM, PROTECTION FILM FOR POLARIZER, POLARIZING PLATE FABRICATED THEREFROM, AND DISPLAY DEVICE EMPLOYING THEREOF

(75) Inventors: Nam-Jeong Lee, Daejeon (KR);
Beom-Seok Kim, Daejeon (KR);
Byoung-Il Kang, Daejeon (KR);
Chan-Hong Lee, Daejeon (KR);
Chang-Hun Han, Daejeon (KR)

(73) Assignee: LG Chem, Ltd., Seoul (KR)

( * ) Notice: Subject to any disclaimer, the term of this patent is extended or adjusted under 35 U.S.C. 154(b) by 95 days.

(21) Appl. No.: 12/811,638

(22) PCT Filed: Dec. 31, 2008

(86) PCT No.: PCT/KR2008/007826
§ 371 (c)(1),
(2), (4) Date: Jul. 2, 2010

(87) PCT Pub. No.: WO2009/084909
PCT Pub. Date: Jul. 9, 2009

(65) Prior Publication Data
US 2010/0296031 A1    Nov. 25, 2010

(30) Foreign Application Priority Data
Jan. 3, 2008 (KR) .................. 10-2008-0000638

(51) Int. Cl.
C08F 120/18 (2006.01)
G02F 1/1335 (2006.01)
C08L 33/10 (2006.01)
G02B 5/30 (2006.01)

(52) U.S. Cl. .............. 526/326; 526/329.3; 526/329.7; 526/266; 349/96; 524/560; 359/483.01; 525/418

(58) Field of Classification Search .............. 526/326, 526/326.3, 326.7, 266, 329.3, 329.7; 525/418; 428/1.1; 349/96; 359/483.01; 524/560
See application file for complete search history.

(56) References Cited

U.S. PATENT DOCUMENTS

| 2006/0100391 A1 | 5/2006 | Matsumoto et al. |
| 2008/0266493 A1* | 10/2008 | Yonezawa et al. .............. 349/96 |
| 2010/0202049 A1 | 8/2010 | Kang et al. |

FOREIGN PATENT DOCUMENTS

| EP | 1 160 591 | 12/2001 |
| JP | S063-1964 | 1/1988 |
| JP | 05-119217 | 5/1993 |
| JP | 2004-070290 | 3/2004 |
| JP | 2004070290 A * | 3/2004 |
| JP | 2005-314534 | 11/2005 |
| JP | 2006-215463 | 8/2006 |
| JP | 2006-215465 | 8/2006 |
| JP | 2006-243681 | 9/2006 |
| JP | 2006-284881 | 10/2006 |
| JP | 2006-284882 | 10/2006 |
| JP | 2007-017555 | 1/2007 |
| JP | 2008-262180 | 10/2008 |
| JP | 2010-539279 | 12/2010 |
| KR | 10-2001-0101475 | 11/2001 |
| KR | 10-2005-0116139 | 12/2005 |
| KR | 1020070006928 A * | 11/2007 |
| WO | WO 2007/061041 | 5/2007 |

* cited by examiner

Primary Examiner — Michael M Bernshteyn
(74) Attorney, Agent, or Firm — McKenna Long & Aldridge LLP

(57) ABSTRACT

The present invention relates to an optical film, comprising a copolymer that comprises (a) a (meth)acrylic monomer, (b) an aromatic vinyl monomer, (c) at least one monomer of an acid anhydride monomer and an unsaturated organic acid monomer, and (d) a vinylcyan monomer, a protection film for a polarizer, a polarizing plate fabricated therefrom, and a display device employing the same.

17 Claims, No Drawings

OPTICAL FILM, PROTECTION FILM FOR POLARIZER, POLARIZING PLATE FABRICATED THEREFROM, AND DISPLAY DEVICE EMPLOYING THEREOF

This application is a 35 U.S.C. §371 National Stage entry of International Application No. PCT/KR2008/007826, filed on Dec. 31, 2008, and claims priority to Korean Application No. 10-2008-0000638, filed on Jan. 3, 2008, which are all hereby incorporated by reference in their entireties.

TECHNICAL FIELD

The present invention relates to an optical film, a protection film for a polarizer, a polarizing plate fabricated therefrom, and a display device employing the same. More particularly, the present invention relates to an optical film that is excellent in terms of optical transparency and optical characteristics, as well as adhesive property and chemical resistance of the film, a protection film for a polarizer, a polarizing plate fabricated therefrom, and a display device employing the same.

This application claims priority from Korean Patent Application No. 10-2008-0000638 filed on Jan. 3, 2008 in the Korean Intellectual Property Office, the disclosure of which is incorporated herein by reference in its entirety.

BACKGROUND ART

In general, a polarizing plate has a structure of laminating a triacetyl cellulose film (hereinbelow, referred to as TAC film) as a protection film on a polarizer by using a water-based adhesive composed of an aqueous solution of polyvinyl alcohol. However, both of the polyvinyl alcohol film used as the polarizer and the TAC film used as the protection film for a polarizer do not have sufficient heat resistance and humidity resistance. Thus, the polarizing plate including the above films has many drawbacks in terms of its use, since degree of polarization deteriorates, separation of the polarizer and the protection film occurs, or optical characteristics deteriorate under a high temperature or high humidity environment.

In addition, the TAC film has high variation in its in-plane retardation ($R_{in}$) and thickness retardation ($R_{th}$) according to environmental temperature/humidity, in particular, in the retardation for obliquely incident light. Upon employing a polarizing plate that includes the TAC film having such properties as a protection film in a liquid crystal display device, there are problems in that the view angle characteristic varies according to environmental temperature/humidity, and thus image quality deteriorates. In addition, the TAC film has poor dimensional stability as well as a relatively high photoelastic coefficient, depending on environmental temperature/humidity. Therefore, after a durability test under high temperature and high humidity environment, changes in the retardation characteristics occur locally, and thus image quality may deteriorate.

As an alternative to the TAC film, an acrylic resin is well known. However, the acrylic resin is easily broken or cracked, which causes a problem in transportation during production process of the polarizing plate, and reduces productivity.

In order to solve the problems, a method of blending the acrylic resin with other resins or a toughening agent (Japanese Patent Publication Nos. 2006-284881 and 2006-284882) or a method of co-extruding other resins (Japanese Patent Publication Nos. 2006-243681, 2006-215463, 2006-215465, and 2007-017555) has been suggested. However, there are problems in that these methods do not sufficiently provide the intrinsic properties of the acrylic resin, including high heat resistance and high transparency or have a complicated laminated structure.

DISCLOSURE OF INVENTION

Technical Problem

It is an object of the present invention to provide an optical film that is excellent in terms of optical transparency and optical characteristics, as well as adhesive property and chemical resistance of the film, a protection film for a polarizer, a polarizing plate fabricated therefrom, and a display device employing the same.

Technical Solution

The present invention provides an optical film, comprising a copolymer that comprises (a) 30 to 90% by weight of a (meth)acrylic monomer, (b) 8 to 40% by weight of an aromatic vinyl monomer, (c) 1 to 15% by weight of at least one monomer of an acid anhydride monomer and an unsaturated organic acid monomer, and (d) 1 to 15% by weight of a vinylcyan monomer.

Further, the present invention provides a protection film for a polarizer, comprising a copolymer that comprises (a) 30 to 90% by weight of a (meth)acrylic monomer, (b) 8 to 40% by weight of an aromatic vinyl monomer, (c) 1 to 15% by weight of at least one monomer of an acid anhydride monomer and an unsaturated organic acid monomer, and (d) 1 to 15% by weight of a vinylcyan monomers.

Further, the present invention provides a polarizing plate, comprising a polarizer and a protection film provided on at least one side of the polarizer, in which at least one protection film comprises a copolymer that comprises (a) a (meth)acrylic monomer, (b) an aromatic vinyl monomer, (c) at least one monomer of an acid anhydride monomer and an unsaturated organic acid monomer, and (d) a vinylcyan monomer.

Furthermore, the present invention provides a display device, comprising the optical film or polarizing plate.

ADVANTAGEOUS EFFECTS

The optical film according to the present invention is excellent in terms of optical transparency and optical characteristics, as well as chemical resistance. Thus, the optical film is used as a protection film for a polarizer, thereby improving the performance of a polarizing plate and a display device that include the optical film.

BEST MODE FOR CARRYING OUT THE INVENTION

Hereinafter, the present invention will be described in detail.

The optical film according to the present invention is characterized in that it comprises a copolymer comprising (a) 30 to 90% by weight of a (meth)acrylic monomer, (b) 8 to 40% by weight of an aromatic vinyl monomer, (c) 1 to 15% by weight of at least one monomer of an acid anhydride monomer and an unsaturated organic acid monomer, and (d) 1 to 15% by weight of a vinylcyan monomer.

In the present invention, the copolymer refers to a copolymer formed by polymerization of (a) the (meth)acrylic monomer, (b) the aromatic vinyl monomer, (c) at least one monomer of the acid anhydride monomer and the unsaturated organic acid monomer, and (d) the vinylcyan monomer, in which its structure is expressed by terms of the monomers for convenience. It will be apparent to those skilled in the art that double bonds of the monomers are not actually present in the main chain of the copolymer.

In the present invention, (a) the (meth)acrylic monomer may provide the film with optical transparency and optical characteristics. As (a) the (meth)acrylic monomer, any compound may be used, as long as it has double bonds between the carbonyl group of ester group and conjugated carbon atoms, and its substituent is not particularly limited. As used herein, the (meth)acrylic monomer encompasses acrylate as well as acrylic derivatives, including alkylacrylate, alkyl methacrylate, and alkyl butacrylate.

In particular, example of the (meth)acrylic monomer includes a compound represented by the following Formula 1:

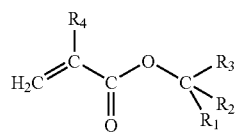

[Formula 1]

wherein $R_1$, $R_2$ and $R_3$ are the same or different from each other, and each independently represent a hydrogen atom or a monovalent hydrocarbon group having 1 to 30 carbon atoms, which may contain a hetero atom; and $R_4$ represents a hydrogen atom or an alkyl group having 1 to 6 carbon atoms.

Other examples of the (meth)acrylic monomer may include alkyl acrylate containing a straight or branched chain alkyl group having 1 to 12 carbon atoms, alkyl methacrylate containing a straight or branched chain alkyl group having 1 to 12 carbon atoms, and alkyl butacrylate containing a straight or branched chain alkyl group having 1 to 12 carbon atoms.

In the copolymer, the content of the (meth)acrylic monomer is 30 to 90% by weight, preferably 55 to 90% by weight, and more preferably 60 to 90% by weight. If the content of the (meth)acrylic monomer is less than 30% by weight, transparency may deteriorate. If the content of the (meth)acrylic monomer is more than 90% by weight, heat resistance may deteriorate.

In the present invention, (b) the aromatic vinyl monomer may contribute to moldability and retardation of the film. Preferred examples of (b) the aromatic vinyl monomer may include, but not particularly limited to, a monomer unsubstituted or substituted with one or more $C_1$ to $C_5$ alkyl group or halogen group at benzene ring. For example, styrene or styrene derivatives such as α-methylstyrene, p-methylstyrene, and vinyl toluene may be preferably used.

In the copolymer, the content of (b) the aromatic vinyl monomer is preferably 8 to 40% by weight. If the content of the aromatic vinyl monomer is less than 8% by weight, a polymerization conversion ratio may be reduced, and moldability of the film may deteriorate. If the content of the aromatic vinyl monomer is more than 40% by weight, transparency may deteriorate.

In the present invention, the acid anhydride monomer and the unsaturated organic acid monomer in (c) the monomer may contribute to adhesive property and heat resistance of the film. In particular, if the unsaturated organic acid monomer is contained, the copolymer may have a high glass transition temperature, and also contribute to improvement in adhesive strength with a polarizer due to its own functional group.

As the acid anhydride monomer, carboxylic acid anhydride may be used, and polyvalent carboxylic acid anhydride such as monovalent or divalent carboxylic acid anhydride may be used. It is preferable to use maleic anhydride or derivatives thereof, for example, a compound represented by the following Formula 2:

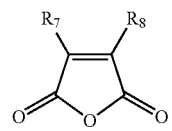

[Formula 2]

wherein $R_7$, and $R_8$ each independently represent a hydrogen atom or an alkyl group having 1 to 6 carbon atoms.

The unsaturated organic acid monomers refer to monomers, which have one or more double bonds, and thus can undergo radical polymerization due to their double bonds. Although there is no specific mention that the unsaturated organic acid monomers have two or more double bonds, it is understood that they have two or more double bonds.

It is preferable that the unsaturated organic acid monomers have one or more carboxylic rids. It is more preferable that the unsaturated organic acid monomer is unsaturated carboxylic acid having double bonds between the carboxyl group and the conjugated carbon atoms, and their substituents are not particularly limited. In particular, the unsaturated organic acid monomer may be preferably monovalent or polyvalent carboxylic acid, including monovalent carboxylic acid such as (meth)acrylic acid and divalent carboxylic acid such as maleic acid, but is not limited thereto.

If the unsaturated organic acid monomer is a (meth)acrylic acid, the (meth)acrylic acid is preferably a (meth)acrylic acid compound represented by following Formula 3, but other (meth)acrylic acid derivatives such as alkyl methacrylic acid may be used:

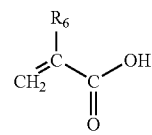

[Formula 3]

wherein $R_6$ represents a hydrogen atom or an alkyl group having 1 to 6 carbon atoms.

Examples of the divalent carboxylic acid may include maleic acid and maleic acid derivatives having at least one substituted alkyl group.

In the copolymer, the content of the acid anhydride monomer and unsaturated organic acid monomer is preferably 1 to 15% by weight. If the content is less than 1% by weight, heat resistance may deteriorate. If the content is more than 15% by weight, transparency may deteriorate.

(d) the vinylcyan monomer may improve chemical resistance of the optical film according to the present invention. The content of the vinylcyan monomer is preferably 1 to 15% by weight. If the content is less than 1% by weight, the effect of improving chemical resistance is not obtained. If the content is more than 15% by weight, there are problems in that color and thermal stability deteriorate.

Examples of the vinylcyan monomer are preferably one or more monomers selected from the group consisting of acrylonitrile, methacrylonitrile, and ethacrylonitrile.

The copolymer comprising (a) the (meth)acrylic monomer, (b) the aromatic vinyl monomer, (c) at least one monomer of the acid anhydride monomer and the unsaturated organic acid monomer, and (d) the vinylcyan monomer may further comprise an imide-based monomer as a comonomer. Examples of the imide-based monomer may include maleimide, methylmaleimide, ethylmaleimide, phenylmaleimide, and cyclohexylmaleimide. The imide-based monomer is preferably contained in an amount of 15% by weight or less.

In the present invention, each one monomer of the above-mentioned monomers may be contained in the copolymer, or two or more of any one or more monomer may be contained in the copolymer.

In the present invention, preferred examples of the copolymer may include a copolymer of (meth)acrylic monomer-aromatic vinyl monomer-acid anhydride monomer-vinylcyan monomer and a copolymer of (meth)acrylic monomer-aromatic vinyl monomer-unsaturated organic acid monomer-vinylcyan monomer, in particular, a copolymer of methyl methacrylate(MMA)-styrene(SM)-maleic anhydride (MAH)-acrylonitrile(AN) and a copolymer of methyl methacrylate(MMA)-styrene(SM)-methacrylic acid(MAA)-acrylonitrile(AN).

The copolymer may be polymerized by using a known method in the art, for example, bulk polymerization method.

The above-mentioned copolymer is preferably a random copolymer. The copolymer is characterized in that it has a glass transition temperature of 120 ~130° C., a weight average molecular weight of 80,000 to 150,000, MI (220° C., 10 kg) of 10 or less, preferably 4~10, and a haze of 0.1~2%. The MI is a melt flow index indicating the fluidity of resin, which is measured at 220° C. under a load of 10 kg. In addition, in order to achieve the transparency required in the optical film, the copolymer preferably has a refractive index of 1.48 to 1.545, and more preferably 1.485 to 1.535.

If the weight average molecular weight is less than 80,000, it is difficult to exhibit sufficient toughness. If the weight average molecular weight is more than 150,000, fluidity deteriorates, and thus there is a problem in workability.

The optical film according to the present invention may be manufactured by forming a film using a resin composition comprising the above-mentioned copolymer. A method for forming a film is not particularly limited, and a known method in the art may be used. The optical film according to the present invention may be manufactured by melt extrusion, calendar lamination, and solution cast lamination. The melt extrusion is a method, in which the copolymer is melted by heating in a cylinder, pressed by a screw, and then extruded by a die such as T die. With respect to the temperature for melt extrusion, the inner temperature of an extruder is preferably 230° C., 240° C., 250° C., 260° C. from the extruder inlet, and the die temperature is preferably 265° C. The solution cast lamination is a method, in which a copolymer resin solution is prepared using an organic solvent, and a lamination, the solvent drying and a winding are performed.

In order to manufacture the optical film, a rubber ingredient may be added to the resin composition. The rubber ingredient known in the art may be used, and an acrylic rubber ingredient such as butyl acrylate, a conjugated diene rubber ingredient such as butadiene, or a core-shell type graft copolymer containing a core composed of the above rubbers and a shell composed of acrylic resin may be used. The rubber ingredient or core-shell graft copolymer is contained in an amount of 5 to 40 parts by weight, preferably 10 to 30 parts by weight, based on 100 parts by weight of the copolymer.

In addition, upon manufacturing the optical film, typical additives, for example, a plasticizer, a lubricant, an impact modifier, a stabilizer, or a UV absorber, may be added to the resin composition. In particular, in the case where the optical film according to the present invention is used as a protection film for a polarizer, the UV absorber is preferably added to the resin composition in order to protect the polarizer and liquid crystal panel from UV. The type of UV absorber is not particularly limited, but preferably a benzotriazole-based UV absorber and a triazine-based UV absorber, and a hindered amine light stabilizer such as bis(2,2,6,6-tetramethyl-4-piperidyl) sebaceate may be used. Tinuvin P, Tinuvin328, Tinuvin321 or Tinuvin 360 may be preferably used. As a heat stabilizer, Irganox 259, Irganox 1010, Irgafos168, Irganox 1076, or Irganox 245 may be used.

The optical film according to the present invention has a thickness of 20 to 200 μm, and preferably 40 to 120 μm. Owing to the characteristic of the above-mentioned monomers, the optical film according to the present invention is excellent in terms of optical transparency, optical characteristics, and heat resistance, as well as adhesive strength with a substrate such as polarizer and chemical resistance. The optical film according to the present invention has a glass transition temperature of 105 to 140° C., a heat deflection temperature (Vicat) of 110 to 150° C., MI (220° C., 10 kg) of 3 to 10, and excellent toughness. The optical film according to the present invention preferably has a thermal expansion coefficient CTE (ppm/K, 40 to 90° C.) of 50 to 120, a haze of 0.1 to 2%, and a transmission of 88 to 93%.

The above-mentioned optical film according to the present invention may have an inplane retardation and a thickness retardation of 0 to 10 nm before stretching and an inplane retardation and a thickness retardation of 80 to 200 nm after monoaxial or biaxial stretching.

The stretching process of the optical isotropic film is preferably performed within the temperature range of (Tg−30° C.) to (Tg+10° C.), and more preferably within the temperature range of (Tg−10° C.) to Tg, based on a glass transition temperature (Tg) of the resin composition. In addition, the stretch rate and ratio may be controlled within the desired range to achieve the object of the present invention.

The optical film according to the present invention may be used as a protection film for a polarizer. In this case, in order to improve adhesive strength, the surface may be modified. The modification method may include a method of treating the surface of protection film by corona treatment, plasma treatment or UV treatment and a method of forming a primer layer on the surface of protection film, and both of them may be used. The type of the primer is not particularly limited, but may be preferably a compound having a reactive functional group such as a silane coupling agent.

A polarizing plate comprising the optical film according to the present invention as a protection film may comprise a polarizer and a protection film provided on at least one side of the polarizer, in which at least one of the protection films is the optical film according to the present invention.

In the present invention, the polarizer known in the art may be used without limitation, for example, a film composed of polyvinyl alcohol (PVA) containing iodine or a dichroic dye. The polarizer may be manufactured by absorbing iodine or a dichroic dye on the PVA film, and a preparation method thereof is not particularly limited. As used herein, the polarizer means that it does not comprise a protection film, and the polarizing plate means that it comprises the polarizer and the protection film.

The polarizer and the protection film are adhered to each other by using an adhesive layer. Upon combining the protection film with the polarizing plate, the adhesive known in the art may be used without limitation. Examples of the adhesive may include one-part or two-part polyvinyl alcohol (PVA) adhesive, polyurethane adhesive, epoxy adhesive, styrene butadiene rubber (SBR) adhesive, and hot melt adhesive, but are not limited thereto.

Among the adhesives, the polyvinyl alcohol adhesive is preferably used, in particular, adhesives containing a polyvinyl alcohol-based resin with an acetacetyl group and an amine-based metal compound crosslinking agent are preferably used. The adhesive for the polarizing plate may include 100 parts by weight of the polyvinyl alcohol-based resin with an acetacetyl group and 1 to 50 parts by weight of the amine-based metal compound crosslinking agent.

The polyvinyl alcohol-based resin is not particularly limited as long as the resin is capable of desirably attaching the polarizer and the protection film to each other, and has excellent optical penetration and no consecutive change such as yellowing. In consideration of the desirable crosslinking reaction to the amine-based metal compound crosslinking agent, it is preferable to use the polyvinyl alcohol-based resin with the acetoacetyl group.

The degree of polymerization and saponification of the polyvinyl alcohol-based resin are not particularly limited, as long as the polyvinyl alcohol-based resin contains the acetoacetyl group, but it is preferable that the degree of polymerization be 200 to 4,000 and the degree of saponification be 70 to 999 mol %. In consideration of the desirable mixing to the contained material according to the free movement of molecules, it is more preferable that the degree of polymerization is 1,500 to 2,500 and the degree of saponification is 90 to 999 mol %. In this connection, it is preferable that the polyvinyl alcohol-based resin contain 0.1 to 30 mol % of the acetoacetyl group. In the above-mentioned range, the reaction to the crosslinking agent may be desirably performed and the adhesive may have the desired waterproofing property.

The amine-based metal compound crosslinking agent is a water-soluble crosslinking agent that contains a functional group having a predetermined reactivity to the polyvinyl alcohol-based resin, and preferably a metal complex comprising an amine-based ligand. Examples of metal that is capable of being applied to the metal complex comprise a transition metal such as zirconium (Zr), titanium (Ti), hafnium (Hf), tungsten (W), iron (Fe), cobalt (Co), nickel (Ni), ruthenium (Ru), osmium (Os), rhodium (Rh), iridium (Ir), palladium (Pd), and platinum (Pt). Examples of the ligand that is coupled with the central metal may comprise any ligand as long as the ligand contains at least one amine group such as primary amines, secondary amines (diamines), tertiary amines, or ammonium hydroxides. It is preferable that the amount of the crosslinking agent be 1 to 50 parts by weight based on 100 parts by weight of the polyvinyl alcohol-based resin. In the above-mentioned range, it is possible to provide significant adhesion strength to the target adhesive and to improve the storage stability (pot life) of the adhesive.

The pH of an aqueous solution that comprises the polyvinyl alcohol-based resin with the acetoacetyl group and the amine-based metal compound crosslinking agent is preferably controlled using a pH adjuster to 9 or less, more preferably 2 to 9, and most preferably 4 to 8.5

Adherence of the polarizer and protection film is performed as follows. First, an adhesive is applied on the surface of protection film or the polarizer, PVA film using a roll water, a gravure water, a bar water, a knife water, or a capillary water. Before the adhesive is completely dried, the protection film and the polarizing film are pressed against each other, at a high temperature or at room temperature, using a laminating roll. When using a hot-melt adhesive, a hot pressing roll is required.

When a polyurethane-based adhesive is used, it is preferably prepared from an aliphatic isocyanate-based compound which does not undergo yellowing by light. In the case where a one- or two-part adhesive for dry lamination or an adhesive with relatively low reactivity between isocyanate and hydroxyl group is used, it may be a solution adhesive in which an acetate solvent, a ketone solvent, an ether solvent, or an aromatic solvent is used as a diluent. This adhesive preferably has a low viscosity of 5000 cps or less. The adhesives are required to have excellent storage stability and a light transmission of 90% or higher at 400 to 800 nm.

If showing sufficient tackifying power, a tackifier may be used. If used, a tackifier is preferably heat- or UV-cured sufficiently to show resulting mechanical strength as high as that obtained with an adhesive. Also, the interface adhesion of the tackifier useful in the present invention is large enough so that delamination is possible only when one of the films bonded to each other therethrough is destroyed.

Examples of the tackifier useful in the present invention include tackifiers made from highly optically transparent natural rubber, synthetic rubber or elastomers, vinyl chloride/vinyl acetate copolymers, polyvinylalkyl ether, polyacrylate, or modified polyolefin, and curable tackifiers prepared by the addition of curing agents such as isocyanate to the above materials.

The polarizing plate manufactured by the above method may be used in various fields. In particular, the polarizing plate may be preferably used as a polarizing plate for various display devices, including a polarizing plate for a liquid crystal display device (LCD) and a polarizing plate for antireflection of organic EL display device. In addition, the optical film according to the present invention may be applied to various functional films, for example, a complex polarizing plate manufactured by combination of various optical layers, including a retardation film such as λ/4 film and λ/2 film, a light diffusion plate, a view angle expanding film, a brightness enhancement film, and a reflector sheet.

A pressure sensitive adhesive layer may be provided on at least one side of the polarizing plate in order to facilitate application to a display device or the like. In addition, to protect the pressure sensitive adhesive layer until the polarizing plate is applied to a display device or the like, a release film may be further provided on the pressure sensitive adhesive layer.

In addition, the present invention provides a display device comprising the optical film or retardation film. The display device includes LCD.

For example, the present invention provides a display device comprising the optical film or retardation film according to the present invention as a protection film for at least one of the first polarizing plate and the second polarizing plate or as a retardation film provided between the liquid crystal cell and at least one of the first polarizing plate and the second polarizing plate, in which a light source, a first polarizing plate, liquid crystal cell, and a second polarizing plate is sequentially laminated.

The liquid crystal cell includes a liquid crystal layer; a substrate for supporting the same; and an electrode layer for applying voltage to the liquid crystal. In this connection, the polarizing plate according to the present invention may be applied to all liquid crystal modes, including in-plane switching mode (IPS mode), vertically aligned mode (VA mode), optically compensated birefringence mode, twisted nematic mode (TN mode), and fringe field switching mode (FFS mode).

Mode for the Invention

Hereinafter, the present invention will be described in detail with reference to Examples. A better understanding of the present invention may be obtained in light of the following examples which are set forth to illustrate, but are not to be construed to limit the present invention.

EXAMPLE

Organic reagents and solvents used for polymerization were purchased from Aldrich Company, and purified using standard techniques before use. Ethylene having a high degree of purity was obtained from Applied Gas Technology Company, and was passed through a water and oxygen removing filter before use.

Molecular weight and molecular weight distribution were determined by GPC (gel permeation chromatography, Waters). Analysis temperature was 25° C., tetrahydrofuran (THF) was used as a solvent, and polystyrene was used as a standard reference material to determine a number average molecular weight (Mn) and a weight average molecular weight (Mw).

Example 1

To a 3-neck flask equipped with a stirrer and a thermometer, 0.1 g of azobisisobutyronitrile, 5 g of maleic anhydride, 67 g of methyl methacrylate, 18 g of styrene, and 10 g of acrylonitrile were added, and inert nitrogen gas was continuously injected to perform bulk polymerization. At this time, the inner temperature of the flask was 80° C., and a stirring speed was 150 rpm per minute. The polymerization was performed for 5 hrs, and after completing the reaction, the reactant was cooled to room temperature, and precipitated in methanol to obtain a resin.

A resin composition composed of the resin having a ratio of SM-MMA-MAH-AN (styrene-methyl methacrylate-maleic anhydride-acrylonitrile) of 23:65:7:5% by weight and a weight average molecular weight of 130,000 was dried, and then an extruded film having a thickness of 80 μm was manufactured using an extruder including a T die. Then, the film was biaxially stretched near Tg, and then properties of the film were measured. The results are shown in the following Table 1.

Example 2

Properties of a film were measured in the same manners as in Example 1, except using a resin composition composed of a resin having a ratio of SM-MMA-MAH-AN(styrene-methyl methacrylate-maleic anhydride-acrylonitrile) of 23:57:7:13% by weight and a weight average molecular weight of 130,000. The results are shown in the following Table 1.

Example 3

Properties of a film were measured in the same manners as in Example 1, except using a resin composition composed of a resin having a ratio of SM-MMA-MAA-AN(styrene-methyl methacrylate-methacrylic acid-acrylonitrile) of 23:65:7:5% by weight and a weight average molecular weight of 130,000. The results are shown in the following Table 1.

Comparative Example 1

Properties of a film were measured in the same manners as in Example 1, except using a resin composition composed of a resin having a ratio of SM-MMA-MAH(styrene-methyl methacrylate-maleic anhydride) of 23:70:7% by weight and a weight average molecular weight of 130,000. The results are shown in the following Table 1.

Comparative Example 2

Properties of a film were measured in the same manners as in Example 1, except using a resin composition composed of a resin having a ratio of SM-MMA-MAA(styrene-methyl methacrylate-methacrylic acid) of 23:63:16% by weight and a weight average molecular weight of 130,000. The results are shown in the following Table 1.

Comparative Example 3

Properties of a film were measured in the same manners as in Example 1, except using a resin composition composed of a resin having a ratio of SM-MMA-AN(styrene-methyl methacrylate-acrylonitrile) of 23:70:7% by weight and a weight average molecular weight of 130,000. The results are shown in the following Table 1.

Comparative Example 4

Properties of an unstretched TAC film (thickness 80 μm, Fuji film) were measured in the same manners as in Example 1. The results are shown in the following Table 1.

TABLE 1

| | Tg (° C.) | Haze (%) | Chemical resistance | Direct transmission rate (%) | Thermal expansion coefficient (CTE) |
|---|---|---|---|---|---|
| Example 1 | 123 | 0.1 | ○ | 93 | 60 |
| Example 2 | 122 | 0.1 | ○ | 93 | 60 |
| Example 3 | 123 | 0.1 | ○ | 93 | 60 |
| Comparative Example 1 | 124 | 0.1 | X | 92 | 60 |
| Comparative Example 2 | 134 | 2.7 | X | 86 | 55 |
| Comparative Example 3 | 100 | 0.1 | ○ | 93 | 60 |
| Comparative Example 4 | 130 | 0.1 | X | 93 | 40 |

(1) Measurement of Haze and Direct transmission rate - measured in accordance with ASTM 1003.
(2) Chemical resistance - a film having a thickness of 80 μm was dipped in a solution of toluene and ethyl alcohol (50:50) for 1 min, and then its surface was observed with the naked eye (○: No surface crack, Δ: surface crack, X: surface melting occurs).
(3) Tg (glass transition temperature) - measured using Pyris 6 DSC (Differential Scanning Calroimeter, Perkin Elmer).
(4) Thermal expansion coefficient (CTE) - measured using DMA instrument while increasing the temperature of film.

As shown in Table 1, the optical films manufactured in Examples 1 to 3 satisfied the properties of optical film, and had excellent chemical resistance, whereas the optical films manufactured in Comparative Examples 1, 2, and 4 did not have sufficient chemical resistance and the optical film manufactured in Comparative Example 3 did not have sufficient heat resistance.

Experimental Example

Manufacturing of Polarizing Plate

1) Manufacturing of Polarizer

A polyvinyl alcohol (PVA) film having a thickness of 75 μm (degree of polymerization: 2400) was immersed in an aqueous solution containing iodine ($I_2$) and potassium iodide (KI), and then stretched 5 times. Subsequently, the film was put in a crosslinking bath containing an aqueous solution of boric acid and potassium iodide, and the dried at 80° C. for 5 min to manufacture a polarizer.

2) Surface Treatment of Protection Film for Polarizer

In order to improve adhesive strength with the polarizer, the protection films for a polarizer, which were manufactured in Examples 1 to 3 and Comparative Examples 1 to 4, was subjected to corona treatment, and a silane-based primer was applied thereto. As the silane-based primer, 3-aminotrimethoxy silane (Fluka) was dissolved in a cosolvent of isopropyl alcohol and water (weight ratio of 95/5) at a 2% concentration, and stirred for 24 hrs. Then, the surface of corona-treated protection film was coated using a wire bar (#5), and dried in an oven at 60° C. for 10 min. The TAC film of Comparative Example 4 was immersed in a sodium hydroxide aqueous solution of 15% by weight for 5 min, and dried in an oven at 60° C. for 10 min.

3) Manufacturing of Adhesive, Polarizing Plate

Polyvinyl alcohol with an acetoacetyl group (5%) (average degree of polymerization: 2000, saponification degree: 94%) was dissolved in purified water to prepare an 3.8% aqueous solution.

The zirconium amine compound (AC-7, manufactured by Daichi Kigenso Kagaku Kogyo, Co.) was dissolved in purified water to prepare a 3.8% aqueous solution. The zirconium amine compound aqueous solution was added to the polyvinyl alcohol aqueous solution so that the content of the zirconium amine compound aqueous solution is 20 parts by weight based on 100 parts by weight of the polyvinyl alcohol, and the mixing was performed along with the agitation. 1 M hydrochloric acid aqueous solution was added to the resulting mixture solution so that the pH was controlled to 8.5 to manufacture the adhesive.

Using the manufactured adhesive, the films manufactured and surface-treated in Comparative Examples and Examples were laminated on both sides of the polyvinyl alcohol polarizer as a protection film, and dried, attached in an oven at 80° C. for 10 min to manufacture a polarizing plate.

4) Evaluation of Optical Properties

Parallel transmission and cross transmission of the manufactured polarizing plates were measured using a n&k spectrometer (manufactured by n&k Technology).

The results of measuring physical properties of the manufactured polarizing plates are shown in the following Table 2.

TABLE 2

| | Used protection film material | Parallel transmission (%) | Cross transmission (%) |
|---|---|---|---|
| Experimental Example 1 | Example 1 | 42.2 | 0.014 |
| Experimental Example 2 | Example 2 | 42.3 | 0.015 |
| Experimental Example 3 | Example 3 | 42.3 | 0.015 |
| Comparative Experimental Example 1 | Comparative Example 1 | 42.2 | 0.014 |
| Comparative Experimental Example 2 | Comparative Example 2 | 42.1 | 0.014 |
| Comparative Experimental Example 3 | Comparative Example 3 | 42.2 | 0.013 |
| Comparative Experimental Example 4 | Comparative Example 4 | 42.3 | 0.012 |

As shown in Table 2, there is no significant difference in the polarization property between Experimental Examples 1 to 3 (after manufacturing the polarizing plate) and Comparative Experimental Examples 1 to 4 (TAC film applied thereto), indicating that the optical film according to the present invention can be used as a protection film for a polarizer.

The invention claimed is:

1. An optical film, comprising a copolymer comprising:
   (a) 30 to 90% by weight of a (meth)acrylic monomer,
   (b) 8 to 40% by weight of an aromatic vinyl monomer,
   (c) 1 to 15% by weight of at least one monomer of an acid anhydride monomer and an unsaturated organic acid monomer, and
   (d) 1 to 15% by weight of a vinylcyan monomer.

2. The optical film according to claim 1, wherein (a) the (meth)acrylic monomer comprises a compound represented by the following Formula 1:

[Formula 1]

wherein $R_1$, $R_2$ and $R_3$ are the same or different from each other, and each independently represent a hydrogen atom or a monovalent hydrocarbon group having 1 to 30 carbon atoms, which may contain a hetero atom; and $R_4$ represents a hydrogen atom or an alkyl group having 1 to 6 carbon atoms.

3. The optical film according to claim 1, wherein (b) the aromatic vinyl monomer comprises a monomer unsubstituted or substituted with one or more $C_1$ to $C_5$ alkyl group or halogen group at benzene ring.

4. The optical film according to claim 1, wherein (c) the acid anhydride monomer comprises monovalent or divalent carboxylic acid anhydride.

5. The optical film according to claim 1, wherein (c) the unsaturated organic acid monomer comprises monovalent or polyvalent carboxylic acid.

6. The optical film according to claim 1, wherein (d) the vinylcyan monomer comprises acrylonitrile, methacrylonitrile or ethacrylonitrile.

7. The optical film according to claim 1, wherein the copolymer comprises one or more selected from the group consisting of a copolymer of (meth)acrylic monomer-aromatic vinyl monomer-acid anhydride monomer-vinylcyan monomer and a copolymer of (meth)acrylic monomer-aromatic vinyl monomer-unsaturated organic acid monomer-vinylcyan monomer.

8. The optical film according to claim 7, wherein the copolymer comprises a copolymer of methyl methacrylate (MMA)-styrene(SM)-maleic anhydride(MAH)-acrylonitrile (AN) or a copolymer of methyl methacrylate(MMA)-styrene (SM)-methacrylic acid(MAA)-acrylonitrile(AN).

9. The optical film according to claim 1, wherein the copolymer has a glass transition temperature of 120 to 130° C. and a weight average molecular weight of 80,000 to 150,000.

10. The optical film according to claim 1, further comprising one or more additives selected from the group consisting of a rubber ingredient, a plasticizer, a lubricant, an impact modifier, a stabilizer, and a UV absorber.

11. A protection film for a polarizer, comprising the optical film according to claim 1.

12. The protection film for a polarizer according to claim 11, wherein at least one surface of the protection film for a polarizer is treated for adhesion strength improvement.

13. The protection film for a polarizer according to claim 12, wherein the treatment for adhesion strength improvement comprises one or more selected from corona treatment, plasma treatment, UV treatment, and formation of primer layer.

14. A polarizing plate, comprising a polarizer and a protection film provided on at least one side of the polarizer, wherein at least one protection film is the protection film for a polarizer according to claim 11.

15. The polarizing plate according to claim 14, wherein an adhesive layer is provided between the polarizer and the protection film.

16. A display device, comprising the optical film according to claim 1.

17. A display device, comprising the polarizing plate according to claim 14.

* * * * *